Feb. 20, 1951     I. D. PRESS     2,542,701
SWIVEL COUPLING
Filed Dec. 16, 1948

INVENTOR.
Irving D. Press
BY
Williams, Rich & Morse
ATTORNEYS

Patented Feb. 20, 1951

2,542,701

UNITED STATES PATENT OFFICE 2,542,701

SWIVEL COUPLING

Irving D. Press, Union, N. J., assignor to Resistoflex Corporation, Belleville, N. J., a corporation of New York Application December 16, 1948, Serial No. 65,565

4 Claims. (Cl. 285—97.8)

This invention relates to swivel couplings, more particularly to such couplings adapted for attachment to flexible hose or other fluid conduits.

An object of the invention is to provide a coupling which may be attached to the end of a flexible hose, said coupling having a threaded part to be screwed into another member, the threaded part being freely rotatable relative to the part attached to the hose yet adequately sealed against leakage when the hose is subjectd either to pressure or vacuum.

Another object of the invention is to provide a swivel coupling which comprises a minimum of parts and is adapted to manufacture with a minimum of machining operations.

A further object is to provide a swivel coupling and sealing means permitting the coupling to be screwed and unscrewed many times without developing leaks.

Other objects and advantages of the invention will appear in the course of the following detailed description of the present preferred embodiment of the invention, taken in conjunction with the drawings in which, Fig. 1 is a side elevation of a swivel coupling the upper half of which is shown in central longitudinal section;

Figure 1:
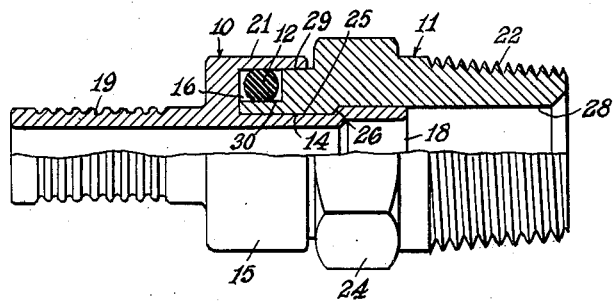

Referring to Fig. 1, the swivel coupling of the invention comprises two relatively rotatable metal parts, namely, a tubular or shank member generally indicated at 10 and a threaded coupling member generally indicated at 11. They are permanently connected together in a manner hereinafter described and the joint between them is made fluid-tight by means of an O-ring 12. The term "O-ring" has become well recognized in the art as indicating a resilient circular ring having a round cross-section, molded and trimmed to the desired dimensions. Such rings may be made to very close tolerances.

Figure 7:
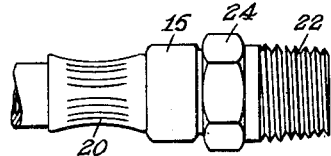
Fig. 7 is an elevation of a completed coupling attached to the end of a flexible hose.

The member 10 comprises a cylindrical tube 14, the base of which is surrounded by an integral body portion 15 in which is an annular chamber 16 which opens toward the end 18 of the tube 14. Extending outwardly from the body portion 15, in the opposite direction from tube 14, is a shank 19 for insertion in the end of a hose, it being understood that the hose will be secured thereon by means of a crimped ferrule or other suitable clamp, as shown at 20 in Fig. 7. Of course the particular means by which the hose or other conduit is attached to the coupling may take various forms and it is to be understood that this portion of the coupling forms no part of the invention.

Tube 14, prior to assembly of the coupling parts, is straight and of uniform diameter throughout. The annular chamber 16 which surrounds the base of the tube has a cylindrical outer wall, the inner wall of the chamber being the outer wall of tube 14.

Coupling member 11 is provided at its outer end with a pipe thread 22 behind which is a hexagonal portion 24 to be engaged by a wrench. The base portion of coupling member 11 is provided with a bore 25 of such size as to have a sliding fit on the outer wall of tube 14, the forward end of this bore being some distance behind the end 18 of tube 14 and terminating at the shoulder 26 outwardly of which member 11 is provided with an enlarged bore 28, so that the inner end of this enlarged bore surrounds a substantial portion of the tube 14. After the parts have been assembled, as shown in Fig. 1, that portion of tube 14 which underlies the enlarged bore 28 is expanded by means of a punch so that the parts are held together by engagement of the base of the expanded portion of the tube end with shoulder 26. This tube-expanding operation is performed so as to leave the parts relatively rotatable but with as little relative longitudinal movement as possible.

Figure 5:
Figs. 5 and 6 are respectively a central sectional view and an elevation of the sealing member or O-ring.
Figure 6:
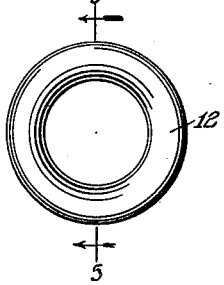

The outer surface of the base portion of the threaded coupling member 11 is provided with a cylindrical surface 29 which closely engages the inner surface of the outer chamber wall 21. That part of the base portion of member 11 which lies within chamber 16 is provided with an annular recess defined, in the embodiment shown, by cylindrical flange 30 and the raidally-extending face 31. This recess, together with the outer wall 21 and bottom wall 32 of the chamber 16, forms an annular cavity having a rectangular cross-section and in this cavity is positioned the O-ring 12. This ring, prior to assembly, has a circular cross-section as shown at 33 in Fig. 5 and is so proportioned relative to the cavity that when assembled it is slightly compressed between flange 30 and wall 21. The distance between radial face 31 and bottom wall 32 is slightly greater than the diameter of O-ring 12 in its slightly compressed condition, leaving space through which the O-ring can move longitudinally when subjected to fluid pressure.

From the foregoing description it will be understood that when a hose or other conduit has been connected to the shank 19 or its equivalent, the conduit may be connected to another member containing an orifice threaded to receive member 11 by rotating member 11 without rotating the conduit due to the fact that member 11 is free to revolve about the tube 14.

Figure 2:
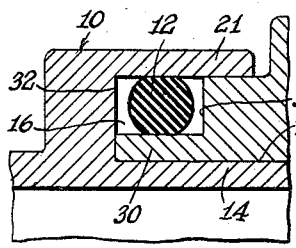
Fig. 2 is a detailed section through the seal showing the position of its parts in an unstressed condition.
Figure 3:
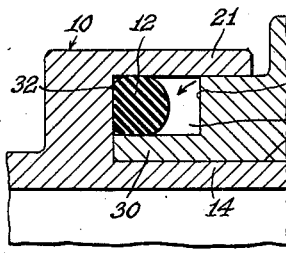
Fig. 3 is a similar view showing the position of the sealing member when the conduit of which the coupling forms a part is subjected to vacuum.
Figure 4:
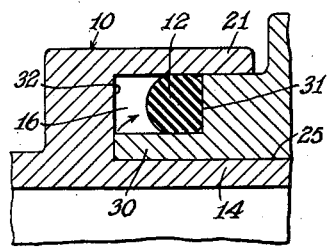
Fig. 4 is a similar view showing the position of the sealing member when the coupling is subjected to internal fluid pressure.

The O-ring functions to provide a fluid-tight seal in the manner illustrated in Figs. 2, 3 and 4. If the conduit is subjected to neither pressure nor vacuum the O-ring may assume the position shown in Fig. 2 in which it forms a seal by tight contact with flange 30 and wall 21. Fig. 3 illustrates the action of the O-ring under vacuum within the conduit which will tend to produce fluid flow in the direction of the arrow and cause the O-ring to move against the bottom wall 32 and seal the joint between wall 32 and flange 30, thus preventing any flow between coupling parts 10 and 11. When the opposite condition exists and there is pressure within the conduit tending to cause fluid flow in the direction of the arrow in Fig. 4, O-ring 12 will move in the opposite direction and seal the joint between face 31 and wall 21. The greater the pressure acting on the O-ring the tighter it seals the coupling.

It is to be understood that the joints between the metal parts are made to fit as closely as possible within the limits of practical manufacture but no matter how close the fit there is bound to be some leakage between metal surfaces which are relatively rotatable. Due to this leakage, sufficient pressure will be built up on one side or the other of the O-ring to cause it to perform its sealing function.

It will be observed that both the tubular member 10 and the threaded coupling member 11 are so formed that they can be turned out on automatic screw machines without the necessity of reversing the work. The substantial length of the end of tube 14 which is expanded into the enlarged bore 28 gives the coupling very great tensile strength and the ability to withstand heavy pressures or mechanical stresses acting to separate the coupling parts. The coupling also has great stability and strength with respect to transverse loading.

While the invention has been illustrated by reference to a particular embodiment it is evident that various modifications may be made therein without departing from the invention. In particular, any desired type of connection may be used between the tubular member 10 and the conduit with which it is to be used. The specific threaded connection shown on the coupling member 11 is merely illustrative and the invention contemplates the use of any other types of connections requiring rotation of member 11. The body portion 15 may, if desired, be supplied with wrench-engaging surfaces so that it may be held against rotation during attachment of the coupling. The cylindrical flange 30 which is shown as formed on member 11 so as to adjoin tube 14 may, if desired, be positioned in alignment with the surface 29 so that the O-ring is positioned inside the base portion of member 11 between the flange and tube 14 without changing the operation of the coupling. The invention therefore is to be construed broadly within the purview of the claims.

What is claimed is:

1. A swivel coupling comprising, in combination, a tube, an integral body portion surrounding the base of said tube, an annular chamber in said body portion concentric with and opening toward the end of said tube, a coupling member having a base portion containing a bore rotatably fitting on and shorter than said tube, said base portion fitting closely between the side walls of said chamber and having an annular recess adjacent its end forming with a side wall of said chamber an annular cavity, and a resilient O-ring in said cavity, said ring and said cavity being so proportioned as to compress the ring slightly in its radial dimension and to permit slight axial movement of the ring when subjected to fluid pressure, said coupling member having an enlarged bore concentric with the bore in its base portion and surrounding a substantial portion of the end of said tube, said end portion of said tube being radially expanded into said enlarged bore.

2. A swivel coupling comprising, in combination, a tube, an integral body portion surrounding the base of said tube, an annular chamber in said body portion concentric with and opening toward the end of said tube, a coupling member having a base portion containing a bore rotatably fitting on and shorter than said tube, said base portion fitting closely between the side walls of said chamber and terminating in a cylindrical flange, said flange forming with the outer side wall of said chamber two sides of an annular cavity of rectangular cross-section, and a resilient O-ring in said cavity, said ring and said cavity being so proportioned as to compress the ring slightly in its radial dimension and to permit slight axial movement of the ring when subjected to fluid pressure, said coupling member having an enlarged bore concentric with the bore in its base portion and surrounding a substantial portion of the end of said tube, said end portion of said tube being radially expanded into said enlarged bore.

3. A swivel coupling comprising, in combination, a cylindrical tube, an integral enlarged body portion surrounding the base of said tube, an annular chamber in said body portion concentric with and opening toward the end of said tube, a threaded coupling member having a base portion containing a bore rotatably fitting on and shorter than said tube, said base portion fitting closely between the side walls of said chamber and having an annular recess adjacent its end forming with a side wall of said chamber an annular cavity of rectangular cross-section, a resilient O-ring in said cavity, said ring and said cavity being so proportioned as to compress the ring slightly in its radial dimension and to permit slight axial movement of the ring when subjected to fluid pressure, said coupling member having an enlarged bore surrounding a substantial portion of the end of said tube, said end portion of said tube being radially expanded into said enlarged bore, and means integral with said body portion for attachment to a conduit.

4. A swivel coupling for attachment to a hose end comprising coaxial, relatively rotatable shank and coupling members; said shank member having a body portion, a shank extending outwardly therefrom for insertion in the hose end and a tubular portion extending in the opposite direction, said body portion having an annular chamber surrounding the root end of said tubular portion; said coupling member having a base portion having a bore rotatably fitting on and shorter than said tubular portion and an enlarged bore adjacent thereto forming an internal circumferential shoulder, said base portion fitting closely between the side walls of said chamber and terminating in a cylindrical flange lying wholly within said chamber against a side wall thereof, a resilient O-ring positioned in the space between said flange and the outer wall of said chamber and slightly compressed therebetween; the outer end of said tubular portion being radially expanded behind said shoulder into the enlarged bore to prevent longitudinal separation of said shank and coupling members.

IRVING D. PRESS.

REFERENCES CITED

The following references are of record in the file of this patent:

UNITED STATES PATENTS

| Number | Name | Date |
|---|---|---|
| 1,450,126 | Wilson | Nov. 27, 1923 |
| 2,477,676 | Woodling | Aug. 2, 1949 |